US012720025B2

(12) United States Patent
Sunagare

(10) Patent No.: US 12,720,025 B2
(45) Date of Patent: Aug. 25, 2026

(54) ELECTRONIC DEVICE, DEVICE MANAGEMENT SERVER, CONTROL METHOD FOR ELECTRONIC DEVICE, AND CONTROL METHOD FOR DEVICE MANAGEMENT SERVER

(71) Applicant: Sharp NEC Display Solutions, Ltd., Tokyo (JP)

(72) Inventor: Hiroshi Sunagare, Tokyo (JP)

(73) Assignee: Sharp Display Solutions, Ltd., Tokyo (JP)

( * ) Notice: Subject to any disclaimer, the term of this patent is extended or adjusted under 35 U.S.C. 154(b) by 333 days.

(21) Appl. No.: 18/377,227

(22) Filed: Oct. 5, 2023

(65) Prior Publication Data

US 2024/0040091 A1 Feb. 1, 2024

Related U.S. Application Data

(63) Continuation of application No. PCT/JP2021/023037, filed on Jun. 17, 2021.

(51) Int. Cl.
*H04N 9/31* (2006.01)

(52) U.S. Cl.
CPC ................................ *H04N 9/3179* (2013.01)

(58) Field of Classification Search
CPC ............ H04N 9/3179; H04N 9/31282; H04N 9/3185; H04N 9/3188; H09Q 9/00
See application file for complete search history.

(56) References Cited

U.S. PATENT DOCUMENTS

2018/0060011 A1* 3/2018 Tatsukawa ....... H04N 21/43615

FOREIGN PATENT DOCUMENTS

| | | |
|---|---|---|
| JP | 2006-195509 A | 7/2006 |
| JP | 2010-243845 A | 10/2010 |
| JP | 2017-528895 A | 9/2017 |
| JP | 2017-204203 A | 11/2017 |
| WO | WO 2016/050571 A1 | 4/2016 |

OTHER PUBLICATIONS

Kuroda, JP2017-204203 Machine Translation in English; Oct. 30, 2025 (Year: 2017).*
International Search Report (ISR) (PCT Form PCT/ISA/210), in PCT/JP2021/023037, dated Sep. 14, 2021, with English translation.

* cited by examiner

*Primary Examiner* — Ryan D Howard
(74) *Attorney, Agent, or Firm* — McGinn IP Law Group, PLLC

(57) ABSTRACT

An electronic device includes: a transmission unit configured to transmit to a device management server, position information indicating a position where the electronic device is installed, unique information uniquely assigned to the electronic device, and setting information set to the electronic device; a first reception unit configured to receive from the device management server, setting information set to the electronic device, based on the position information and the unique information; and a control unit configured to perform a setting of the electronic device based on the received setting information.

16 Claims, 8 Drawing Sheets

FIG. 2

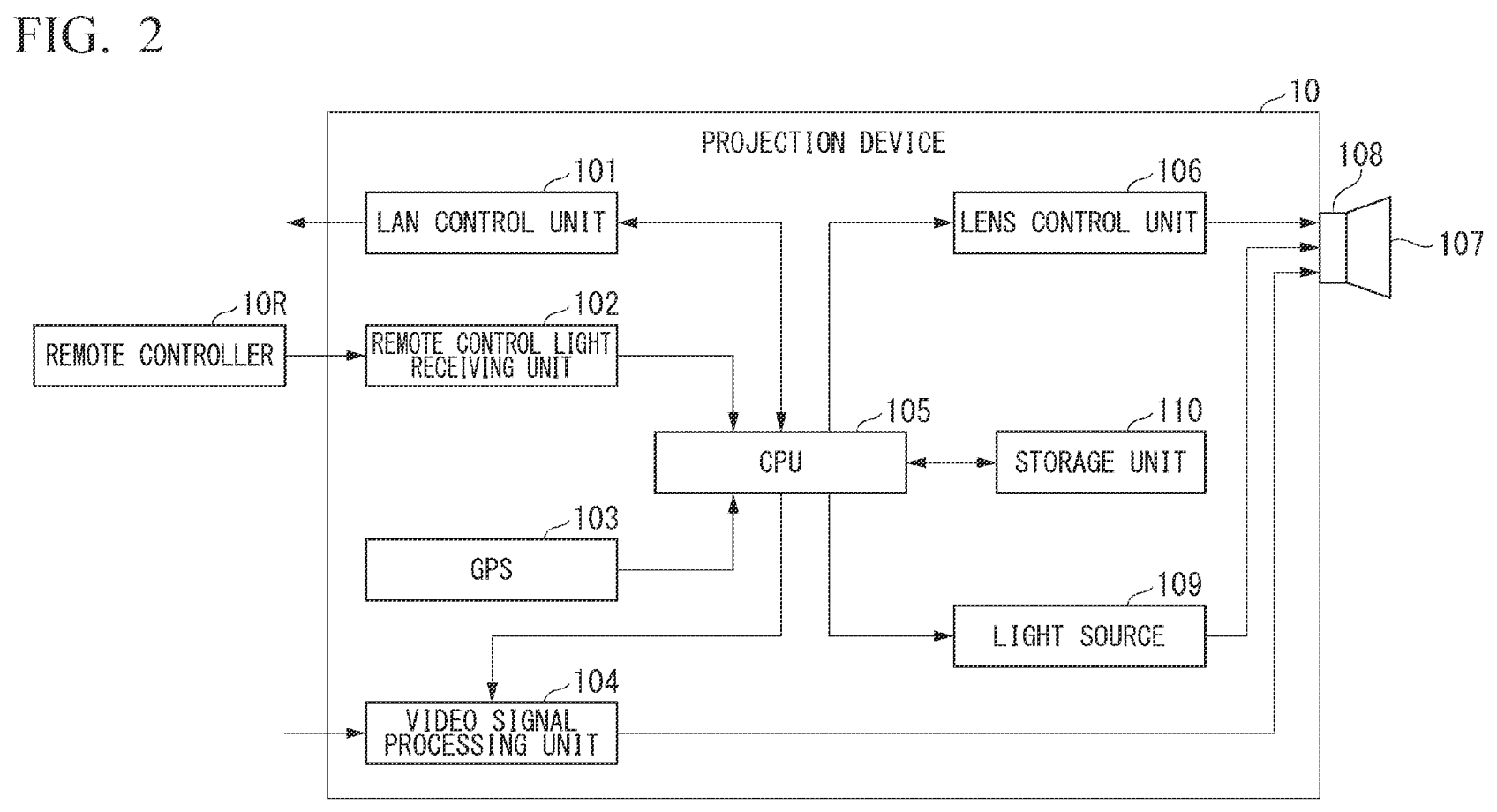

PROJECTION DEVICE
10
101 LAN CONTROL UNIT
102 REMOTE CONTROL LIGHT RECEIVING UNIT
103 GPS
104 VIDEO SIGNAL PROCESSING UNIT
105 CPU
106 LENS CONTROL UNIT
107
108
109 LIGHT SOURCE
110 STORAGE UNIT
10R REMOTE CONTROLLER

FIG. 4

| POSITION INFORMATION | UNIQUE INFORMATION | ADJUSTMENT VALUES | | | SETTING VALUES | | | | |
|---|---|---|---|---|---|---|---|---|---|
| | | COLOR TEMPERATURE | ... | BRIGHTNESS OF LIGHT SOURCE | LENS ZOOM RATIO | LENS FOCUS | ... | LENS SHIFT | SCREEN SELECTION VALUE |
| ... | AAAB 0001 | ... | ... | | | ... | | | ... |
| ... | AAAB 0002 | ... | ... | | | ... | | | ... |
| ... | AAAC 0005 | ... | ... | | | ... | | | ... |
| | AAAD 0010 | | | | | | | | |
| | | | | | | | | | |
| | | | | | | | | | |
| ... | ... | ... | ... | | | ... | | | ... |

ELECTRONIC DEVICE, DEVICE MANAGEMENT SERVER, CONTROL METHOD FOR ELECTRONIC DEVICE, AND CONTROL METHOD FOR DEVICE MANAGEMENT SERVER

This application is a Continuation Application of International Application No. PCT/JP2021/023037, filed on Jun. 17, 2021, the contents of which are incorporated herein by reference.

TECHNICAL FIELD

The present disclosure relates to an electronic device, a device management server, a control method for an electronic device, and a control method for a device management server.

BACKGROUND ART

When installing a projection device, it is necessary to set various device information according to environments of an installation location. Examples of the environments of the installation location include a projection distance, a brightness of a conference room, peripheral devices to be connected, and the like. Examples of the device information include a lens zoom ratio that is a zoom ratio of a lens, a lens focus that determines a focus of a lens, a projection position, an adjustment of a light source of a projection device, an input terminal that is first selected when the power is turned on, and the like. The projection position is a position of a projection screen projected from a projection device. To adjust the projection position, a lens shift mechanism provided in a projection device is used. By adjusting the projection position using the lens shift mechanism, the projection screen can be moved up, down, left, or right.

In Patent Document 1 below, lighting units are connected to a controller via a local network, and lighting parameters (settings) are mutually backed up. In this state, when an inoperable lighting unit is replaced, the backed-up parameters are set to the replaced lighting unit.

CITATION LIST

Patent Document

[Patent Document 1] Published Japanese Translation of PCT International Publication for Patent Application, Publication No. 2017-528895

SUMMARY

Technical Problems

When replacing a projection device due to a failure or the end of life, it is necessary to set a projection device after the replacement with device information including at least one value of a setting value corresponding to a setting item and an adjustment value based on the adjustment item.

However, there are individual differences (variations) among electronic devices such as projection devices. For this reason, there is a problem that even if device information set to a projection device before a replacement is set to a projection device after the replacement, the luminance, color, and the like of the lighting of projection devices differ due to the individual differences.

An object of the present disclosure is to reduce the effects caused by individual differences between an electronic device before a replacement and an electronic device after the replacement.

Solution to the Problems

To solve the above-described problem, an electronic device according to an aspect of the present disclosure includes: a transmission unit configured to transmit to a device management server, position information indicating a position where the electronic device is installed, unique information uniquely assigned to the electronic device, and setting information set to the electronic device; a first reception unit configured to receive from the device management server, setting information set to the electronic device, based on the position information and the unique information; and a control unit configured to perform a setting of the electronic device based on the received setting information.

Further, a device management server according to an aspect of the present disclosure includes: a storage unit configured to store position information indicating a position where an electronic device is installed, unique information uniquely assigned to the electronic device, and setting information set to the electronic device; a first reception unit configured to receive position information and unique information from the electronic device; a first acquisition unit configured to acquire from among a plurality of setting information stored in the storage unit, setting information corresponding to a combination of position information and unique information that matches a combination of the received position information and the received unique information; and a first transmission unit configured to transmit the acquired setting information to the electronic device as a transmission source of the unique information.

Further, a control method for an electronic device according to an aspect of the present disclosure includes: transmitting to a device management server, position information indicating a position where the electronic device is installed, unique information uniquely assigned to the electronic device, and setting information set to the electronic device; receiving from the device management server, setting information set to the electronic device, based on the position information and the unique information; and performing a setting of the electronic device based on the received setting information.

Further, a control method for a device management server according to an aspect of the present disclosure includes: storing in a storage unit of the device management server, position information indicating a position where an electronic device is installed, unique information uniquely assigned to the electronic device, and setting information set to the electronic device; receiving position information and unique information from the electronic device; acquiring setting information corresponding to a combination of position information and unique information that matches a combination of the received position information and the received unique information; and transmitting the acquired setting information to the electronic device as a transmission source of the unique information.

Advantageous Effects

It is possible to reduce the effects caused by individual differences between an electronic device before a replacement and an electronic device after the replacement.

BRIEF DESCRIPTION OF THE DRAWINGS

FIG. 2 is a functional block diagram showing a configuration of a projection device 10.

FIG. 4 is a diagram showing an example of device information.

DESCRIPTION OF EMBODIMENTS

Figure 1:
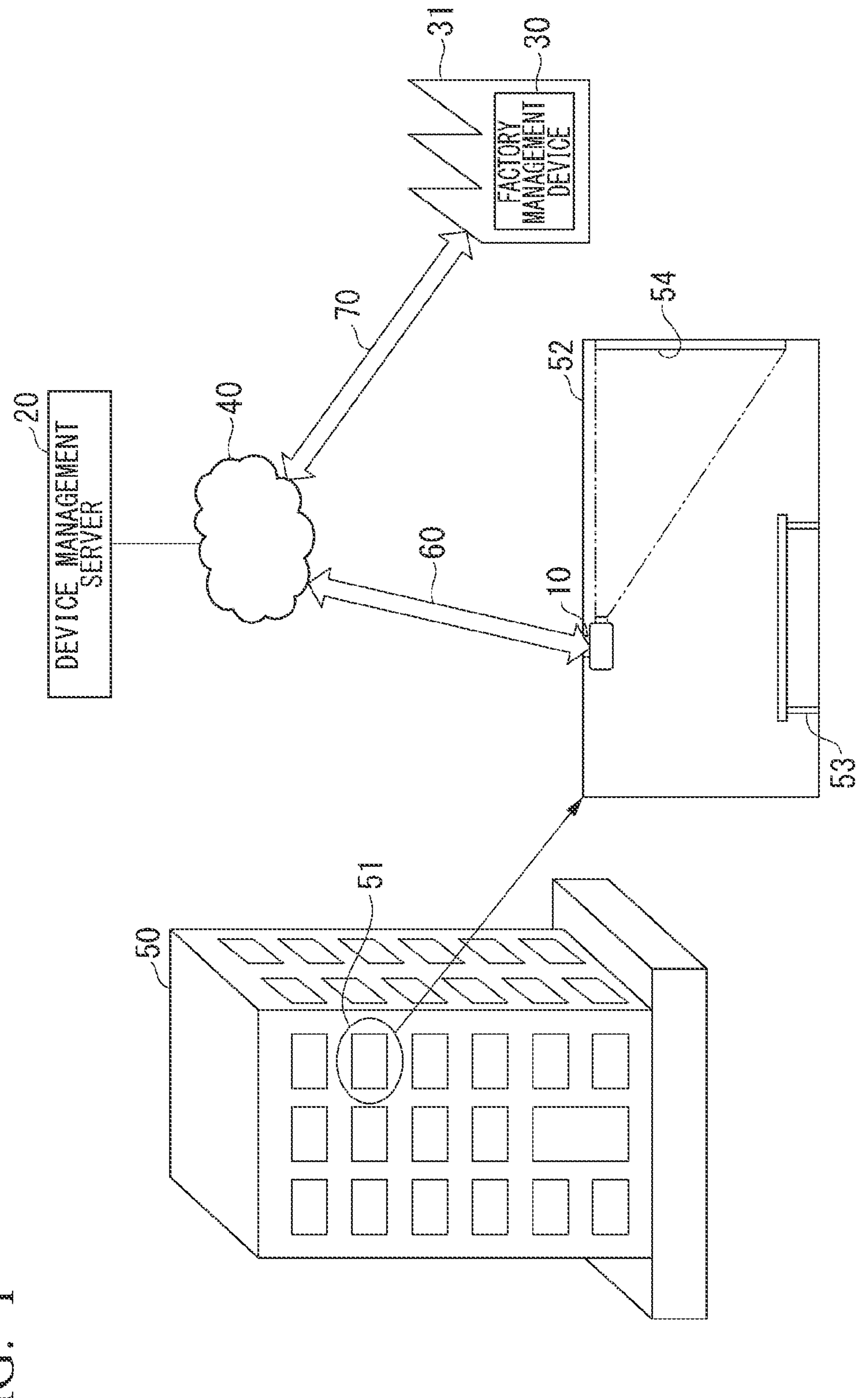
FIG. 1 is a conceptual diagram showing a configuration of a device management system 1.

FIG. 1 is a conceptual diagram showing a configuration of a device management system 1 according to an embodiment of the disclosure.

In the device management system 1, a projection device 10, a device management server 20, and a factory management device 30 are communicatively connected via a network 40.

The projection device 10 is an example of an electronic device, such as a projector. This projection device 10 is an example of an electronic device. The electronic device is not limited to the projection device 10, and may be any other device as long as it is given unique information uniquely assigned to the device and can identify a place where it is installed. For example, the electronic device may be a display device provided with a display panel. The unique information may be any information that can individually identify the projection device 10. For example, a serial number can be used as the unique information. The electronic device may be any of a display device, a stationary computer, and the like.

The projection device 10 is installed, for example, on a ceiling of a conference room 52, which is a room 51 in a building 50 built in a certain area.

A conference desk 53 is installed on a floor of the conference room 52. Further, a screen 54 is installed on a wall surface of the conference room 52.

The screen 54 displays images projected from the projection device 10. Regarding a size of the screen 54, there are a plurality of sizes depending on a combination of a horizontal size and a vertical size. Examples of the size of the screen 54 include 4:3, 16:9, 16:10, and the like, depending on a relationship between the horizontal size and the vertical size of the screen 54. In this example, the horizontal and vertical sizes of the screen 54 have a ratio of 16:10.

The projection device 10 is communicatively connected to the network 40 via a communication line 60. The communication line 60 may be wired or wireless, and may include wired sections and wireless sections. The projection device 10 can communicate with the device management server 20 via the communication line 60 and the network 40.

The device management server 20 is communicatively connected to the projection device 10 via the network 40 and the communication line 60. Further, the device management server 20 is communicatively connected to the factory management device 30 via the network 40 and a communication line 70. The device management server 20 may be a single server device or a cloud server.

At a factory 31, manufacture, adjustment, and inspection of the projection device 10 are performed. The factory management device 30 is installed in the factory 31 that manufactures projection devices. The factory management device 30 may be a server device. At the factory 31, an adjustment process and an inspection process for the projection device 10 are performed.

<<Adjustment Process>>

In the adjustment process, various adjustments for adjustment items of the projection device 10 are performed. Examples of the adjustment items include a color temperature, color unevenness, a brightness of a light source, and the like. In the adjustment process, the adjustment items are measured using measuring instruments corresponding to the respective adjustment items.

<<Inspection Process>>

In the inspection process, it is confirmed that a result of the measurement by the measuring instrument after the adjustment for each adjustment item is within a predetermined range relative to a baseline value. As the baseline value, a specification value can be used. The predetermined range is determined, for example, based on a specification value. For example, the predetermined range for the color temperature is defined as "within a range of A % (e.g., 5%, etc.)," where a specification value of the color temperature is the baseline, and the predetermined range for the brightness of the light source is defined as "within a range of B % (e.g., 5%, etc.)," where a specification value of the brightness of the light source is the baseline.

For example, when the specification value of the color temperature is 7000 Kelvin (hereafter, Kelvin is expressed as "K"), 7000K is targeted for the adjustment in the adjustment process, and it is confirmed in the inspection process whether a result of the measurement of the color temperature by the measuring instrument is within the range of C %, where 7000K is the baseline.

Further, for example, when the specification value of the brightness of the light source 109 is a product specification value 100% (for example, 10000 lumens (hereinafter ln)), 100% is targeted for the adjustment in the adjustment process, and it is confirmed in the inspection process whether the brightness of the light source 109 is within the range of D %, where the product specification value 100% (10000 ln) is the baseline.

In the inspection process, when it is confirmed that a result of the measurement is within the predetermined range relative to the baseline value, unique information (for example, a serial number) assigned to the projection device 10 and an adjustment value as the result of the adjustment for each adjustment item are input to the device management server 20 via an input device and stored therein.

In the inspection process, in order to confirm results of adjustments for the respective adjustment items, for example, measurements are performed using various measuring instruments, and it is confirmed whether a result of each measurement falls within a predetermined range relative to a baseline value. When a result of the measurement does not fall within the predetermined range relative to the baseline value, an adjustment is performed again in the adjustment process.

The factory management device 30 is communicatively connected to the network 40 via the communication line 70. The communication line 70 may be wired or wireless, and may include wired sections and wireless sections. The factory management device 30 can communicate with the device management server 20 via the communication line 70 and the network 40. The factory management device 30 is provided with a storage device that stores, as device information, the unique information assigned to the projection device 10 and the adjustment values of the respective adjustment items (for example, color temperature, color unevenness, and brightness of the light source) measured in the inspection process. The factory management device 30 transmits the device information stored in the storage device to the device management server 20 via the communication line 70 and network 40.

FIG. 2 is a functional block diagram showing a configuration of the projection device 10.

The projection device 10 includes a LAN control unit 101, a remote control light receiving unit 102, a GPS (Global Positioning System) 103, a video signal processing unit 104, a CPU (Central Processing Unit) 105, a lens control unit 106, a projection lens 107, a lens shift mechanism 108, a light source 109, and a storage unit 110. Further, a remote controller 10R is provided outside the projection device 10.

The LAN control unit 101 connects the communication line 60 and the network 40 to the device management server 20, and performs communication processing for various types of communication such as transmission and reception. The LAN control unit 101 is connected to the CPU 105 and communicates with a communication partner according to a control of the CPU 105.

Further, the LAN control unit 101 can function as a transmission unit that transmits to the device management server 20, position information indicating a position where the own electronic device is installed and unique information assigned to the own electronic device. As the position information, a result of a measurement by the GPS 103 can be used. The unique information is stored in the storage unit 110 and read by the CPU 105.

Further, the LAN control unit 101 can function as a first reception unit that receives an adjustment value of device information which includes position information corresponding to the position information transmitted from the LAN control unit 101 and which includes unique information different from the unique information transmitted from the LAN control unit 101, from the device management server 20 that stores device information which includes position information indicating a position where an electronic device is installed, unique information assigned to the electronic device, and an adjustment value of an adjustment target item of the electronic device which has been adjusted so as to fall within a baseline value relative to a target value.

Further, the LAN control unit 101 can also function as a second reception unit that, when the device management server 20 stores device information which includes position information corresponding to the position information transmitted by the LAN control unit 101 and which includes unique information different from the unique information transmitted, receives from the device management server 20, a setting value corresponding to the device information including the different unique information.

The remote controller 10R is provided with a plurality of buttons, and functions as an input unit that receives an operation input according to the pressed button. The remote controller 10R outputs a radio signal according to an operation input. For example, the radio signal is an infrared ray.

Further, the remote controller 10R receives an operation input to change device information.

The remote control light receiving unit 102 receives a radio signal output from the remote controller 10R. More specifically, the remote control light receiving unit 102 receives infrared rays output from the remote controller 10R in response to an operation input to the remote controller 10R. By receiving a wireless signal in response to this operation input, the remote control light receiving unit 102 can receive an operation input to change device information.

The GPS 103 measures a position of the own projection device 10 and outputs a result of the positioning to the CPU 105. More specifically, the GPS 103 generates position information by measuring a position of the projection device 10, and outputs the generated position information to the CPU 105 as a result of the positioning. The position information includes results of measurements of latitude, longitude, and altitude. When the position information includes latitude, longitude and altitude, it is possible to identify the place where the projection device 10 is installed relative to the building or the place where the projection device 10 is installed relative to a fixture or the like arranged in the building. By identifying the installed place in the building, even if the projection device 10 is replaced, when the position information is the same or substantially the same, it can be recognized that the projection device 10 after the replacement has been installed at the same position (place). Further, when it is found as a result of identifying the installed position that the projection device 10 after the replacement has been installed at the same position, a distance from the projection device 10 to the screen is also the same or substantially the same before and after the replacement. In this case, if the setting information before the replacement can be set to the projection device 10 after the replacement, since the distance from the place (position) of actual projection by the projection device 10 to the screen is the same, the projection distance is also the same, so that it is possible to make the color and luminance unchanged before and after the replacement by using the setting information before the replacement.

The GPS 103 may be provided inside the projection device 10.

The video signal processing unit 104 receives a video signal supplied from an external device and performs video processing on the video signal. A video signal is supplied, for example, from an external device such as a computer or a video playback device. The video signal is subjected to video processing by the video signal processing unit 104 and then projected onto the screen 54 via the projection lens 107 together with light from the light source 109.

The video signal processing unit 104 performs settings and adjustments related to video such as color temperature, contrast, brightness (luminance), gamma, and white balance, according to operation inputs via the remote controller 10R. The video signal processing unit 104 performs video processing on the video signal according to results of those settings and adjustments, and outputs the video signal subjected to the video processing. As a result, the video signal according to the results of the settings and adjustments is projected onto the screen 54.

These settings and adjustments can be made on a menu screen. After the projection device 10 is installed at the installed position, the settings and adjustments can be made by operation inputs via the remote controller 10R. Further, before the projection device 10 is shipped, these settings and adjustments can be made to the projection device 10 at the factory 31 using a jig or the remote controller 10R.

<<Color Temperature>>

A color temperature can be any value within a range of 5000K to 10500K.

<<Brightness>>

A brightness of the light source can be any value within a range of 50% to 100%.

<<Luminance>>

A luminance can be any value within a certain range, where 100% (e.g., 10000 ln) is the baseline.

The CPU 105 controls each unit inside the projection device 10.

The CPU 105 communicates via the LAN control unit 101 with the device management server 20 via the communication line 60 and the network 40, and can acquire information from the device management server 20 and transmit information from the projection device 10 to the device management server 20.

The CPU 105 can acquire a wireless signal output from the remote controller 10R via the remote control light receiving unit 102.

The CPU 105 has a position information acquisition function of acquiring from the GPS 103, position information indicating a position where the projection device 10 is installed.

Further, the CPU 105 has a menu function of projecting onto the screen 54, a menu screen that allows various adjustments and settings, and performing various adjustments and settings according to operation inputs on the menu screen.

Examples of the menu function include a setting for selecting a screen size, such that one of multiple types such as 4:3 (horizontal size is 4, vertical size is 3), 16:9, and 16:10 can be selected as a selection value. At the time of shipment from the factory, a selection value for selecting a screen size is set to 16:9, for example.

Further, the CPU 105 can function as a control unit that performs at least one of a setting and an adjustment based on device information received from the device management server 20.

Further, the CPU 105 can also perform settings within the own electronic device based on setting values received from the device management server 20.

Further, the CPU 105 may have a function of a correction unit that corrects the adjustment value stored in the own electronic device, using an adjustment value received by the LAN control unit 101. This function as the correction unit may be provided in the CPU 105 or may be provided in the device management server 20. When the CPU 105 has the function as the correction unit, the device management server 20 need not have the function as the correction unit.

Further, the CPU 105 can also perform at least one of a setting and an adjustment based on the corrected adjustment value. The corrected adjustment value may be obtained by the CPU 105. Alternatively, the corrected adjustment value obtained by, and transmitted from, the device management server 20 may be used.

Further, the CPU 105 can also function as a determination unit that determines whether or not a condition for transmitting device information is satisfied. Further, when the CPU 105 determines that the transmission condition is satisfied, the CPU 105 transmits to the device management server 20 via the LAN control unit 101, the device information, the position information, and the unique information, which are stored in the storage unit 110.

Examples of the transmission condition include a condition that a certain period of time has elapsed (for example, h hours have passed, the next day has come, etc.) since the projection device 10 received an operation input to change a setting value or an adjustment value. In this case, even when an operation to change a setting value or an adjustment value is input multiple times, the changes input until the certain period of time elapses can be collectively transmitted. Further, another transmission condition may be that all setting values or adjustment values are notified from the remote controller 10R to the CPU 105 or notified from the menu screen to the CPU 105, or that the CPU is notified that an instruction to power off the projection device 10 is input.

Here, if device information is transmitted from the projection device 10 to the device management server 20 each time a setting value or an adjustment value is changed, a load on the communication line 60 and the network 40 will increase. For this reason, instead of transmitting the device information to the device management server 20 each time a setting value or an adjustment value is changed, setting values or adjustment values changed until the transmission condition is satisfied are collectively transmitted to the device management server 20.

Alternatively, the setting values or the adjustment values may be transmitted when it is selected as a transmission condition that all setting values or adjustment values are notified from the remote controller 10R to the CPU 105 or notified from the menu screen to the CPU 105, or on condition that the CPU receives a notification when powered off (at the timing when an instruction to power off is input).

In other words, the device information is not transmitted to the device management server 20 unless the setting values or the adjustment values are changed. As a result, it is possible to reduce an increase in the load on the communication line 60 and the network 40. Further, since the number of transmissions of the device information is reduced, a load on the CPU 105 and the LAN control unit 101 can also be reduced.

Based on a control signal from the CPU 105, the lens control unit 106 sends a control signal to the lens shift mechanism 108 provided in the projection lens 107 to control the lens shift mechanism 108. By performing this control, a projection position of a video signal on the screen 54 can be adjusted. Further, based on a control signal from the CPU 105, the lens control unit 106 changes a zoom of the projection lens 107, and changes a focus of the projection lens 107.

The projection lens 107 projects a video signal onto the screen 54 together with the light from the light source 109.

The lens shift mechanism 108 moves the projection position of the projection screen in at least one of vertical and horizontal directions in accordance with a control signal specifying lens shift from the lens control unit 106. Thereby, the projection position of the projection screen relative to the screen 54 can be adjusted.

The light source 109 illuminates the video signal output from the video signal processing unit 104 by lighting based on a control signal from the CPU 105. An amount of light reaching the projection lens 107 from the light source 109 can be changed by driving an aperture mechanism provided in the light source 109. The light source 109 can change the amount of light by driving the aperture mechanism based on a control signal from the CPU 105.

The storage unit 110 stores various data. For example, the storage unit 110 stores setting values input according to an operation instruction to the remote controller 10R. For example, when an operation input to change a setting value is received by the remote control light receiving unit 102, the storage unit 110 stores the received setting value. Further, the storage unit 110 stores unique information assigned to the projection device 10, position information, and adjustment values.

An adjustment value is a value of an item whose value can be changed, which is adjusted so as to fall within a predetermined range relative to a baseline value. For example, the adjustment value can be changed via the adjustment item on the menu screen. As the baseline value, a specification value can be used.

A setting value is a value of an item whose value can be changed, which is changed according to an environment in which the projection device 10 is installed. In other words, a setting value may be a value that can be arbitrarily changed within a changeable range for which a baseline value is not defined.

Figure 3:
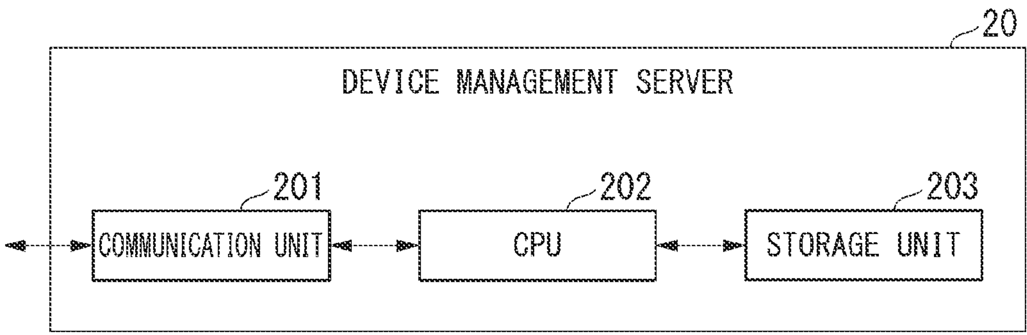
FIG. 3 is a schematic block diagram showing a functional configuration of a device management server 20.

FIG. 3 is a schematic block diagram showing a functional configuration of the device management server 20.

The device management server 20 includes a communication unit 201, a CPU 202, and a storage unit 203.

The communication unit 201 is communicatively connected to the projection device 10 via the network 40 and the communication line 60.

The communication unit 201 can receive position information and unique information from the projection device 10. When the position information and the unique information are received, it is possible to recognize which projection device 10 is installed in which place, based on the position information and the unique information.

The communication unit 201 can receive installation information including position information, unique information, and setting values set to an electronic device as a transmission source. By receiving the installation information, it is possible to recognize what settings have been made to which projection device 10 installed in which place. As the setting values set to the electronic device, setting values stored in a storage device (such as a memory) provided in the electronic device may be used.

Further, the communication unit 201 can function as a first transmission unit that transmits to the projection device 10 as the transmission source of the unique information, an adjustment value of device information, among a plurality of device information stored in the storage unit 203, which includes position information corresponding to the received position information and which includes unique information different from the received unique information. By transmitting such an adjustment value to the projection device 10, the projection device 10 that receives this adjustment value can acquire the adjustment value of the projection device 10 which was previously installed at the same place. By the function of the correction unit (CPU 105), the projection device 10 can obtain a corrected adjustment value using the adjustment value set to the own projection device 10 and the acquired adjustment value.

Further, the communication unit 201 can also function as a second transmission unit that, when the storage unit 203 stores device information which includes position information corresponding to the received position information and which includes unique information different from the received unique information, transmits to the projection device 10 as the transmission source of the unique information, a setting value corresponding to the device information including the different unique information. By transmitting such a setting value to the projection device 10, the projection device 10 that receives the setting value can acquire the setting value set to the projection device 10 which was previously installed at the same place. The projection device 10 sets the acquired setting value to the own projection device 10, so that the setting value becomes the same as that of the previously installed projection device 10.

Further, the communication unit 201 can also transmit the corrected adjustment value to the electronic device as the transmission source of the unique information. The corrected adjustment value is obtained by the CPU 202, which will be described later.

Further, the communication unit 201 reads device information from the storage unit 203 based on an instruction from the CPU 202, and transmits the read device information to the projection device 10.

The CPU 202 controls each unit within the device management server 20.

The CPU 202 can function as a first acquisition unit that, based on the position information and the unique information received by the communication unit 201, acquires an adjustment value of device information, among the plurality of device information stored in the storage unit 203, which includes position information corresponding to the received position information and which includes unique information different from the received unique information. The adjustment value acquired by the function as the first acquisition unit is transmitted by the communication unit 201 (function as the first transmission unit) to the projection device 10 as the transmission source of the unique information.

When the storage unit 203 stores device information which includes position information corresponding to the position information received by the communication unit 201 and which includes unique information identical to the received unique information, the CPU 202 associates the setting value with the device information including the identical unique information and stores them in the storage unit 203. By storing such a setting value in the storage unit 203, the setting value changed in the projection device 10 can be stored in the storage unit 203.

Further, the CPU 202 can also function as a second acquisition unit that, when the storage unit 203 stores device information which includes position information corresponding to the position information received by the communication unit 201 and which includes unique information different from the received unique information, acquires a setting value corresponding to the device information including the different unique information. The setting value acquired by the function as the second acquisition unit is transmitted by the communication unit 201 (function as the second transmission unit) to the projection device 10 as the transmission source of the unique information.

Further, the CPU 202 can function as a correction unit that, when the storage unit 203 stores device information which includes position information corresponding to the position information received by the communication unit 201 and which includes unique information different from the received unique information, corrects adjustment values of the received device information, according to the adjustment values of the device information already stored, using the respective adjustment values of the device information determined to be different. This function as the correction unit may be provided in the CPU 105 or may be provided in the device management server 20. When the device management server 20 has the function as the correction unit, the CPU 105 need not have the function as the correction unit.

The storage unit 203 stores various information. For example, the storage unit 203 stores device information.

FIG. 4 is a diagram showing an example of device information.

The device information includes position information indicating a position where an electronic device is installed, unique information assigned to the electronic device, and an adjustment value of an adjustment target item of the electronic device which has been adjusted so as to fall within a baseline value relative to a target value. The device information may further include a setting value. This setting value may be stored in association with the unique information.

Examples of adjustment values include a color temperature, a brightness of a light source, and the like Examples of setting values include a lens zoom ratio, lens focus, lens shift, a screen selection value, and the like.

Figure 5:
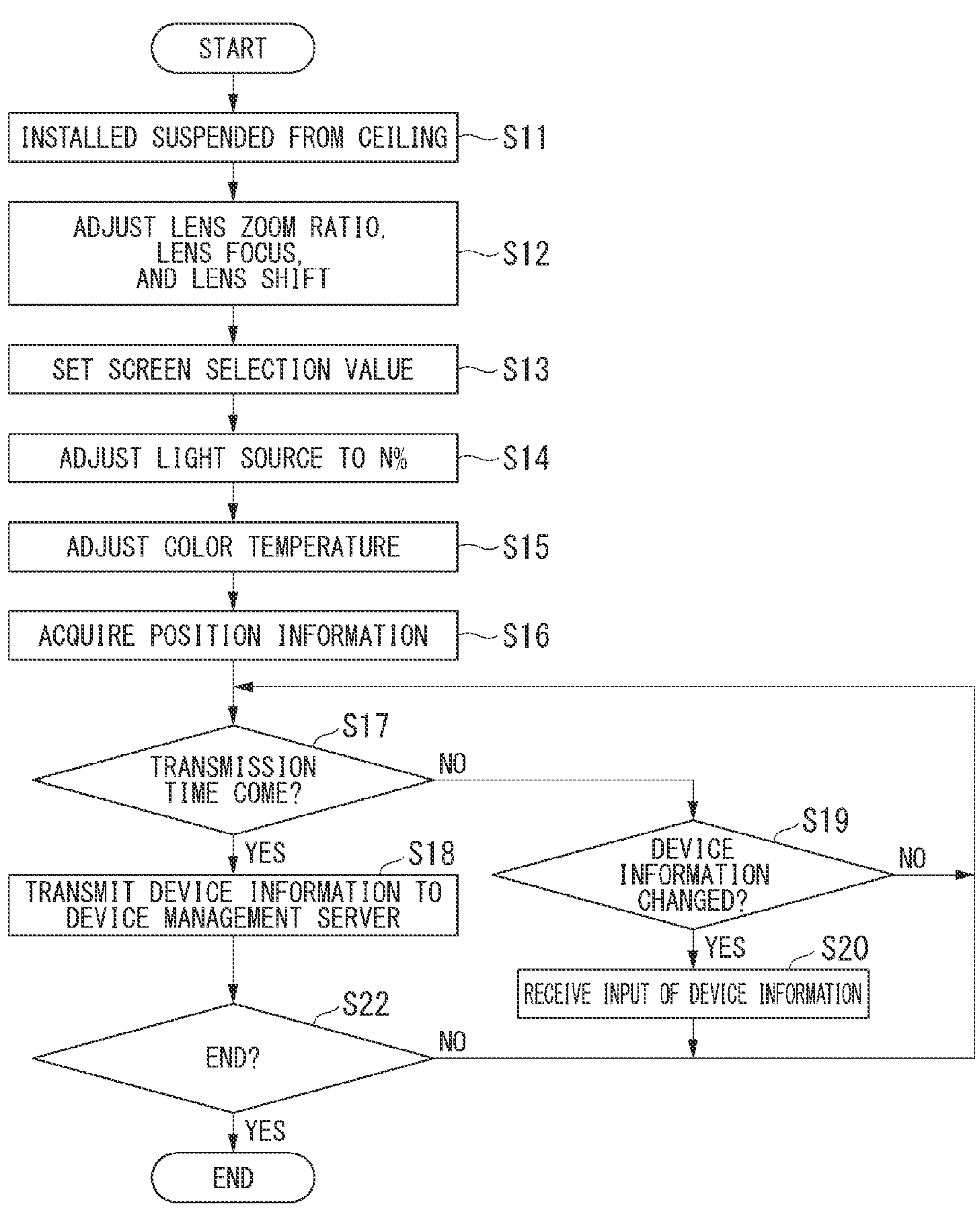
FIG. 5 is a flowchart illustrating an operation of the projection device 10 transmitting device information.

FIG. 5 is a flowchart illustrating an operation of the projection device 10 transmitting device information.

The projection device 10 is physically installed suspended from a ceiling of the conference room 52 of the building 50 by a person in charge of installation (step S11).

Next, after turning on the power of the projection device 10, the person in charge of installation uses the remote controller 10R to adjust a lens zoom ratio, lens focus, and lens shift so that a projection state of a projection screen becomes appropriate with respect to the screen 54. The CPU 105 of the projection device 10 receives, via the remote control light receiving unit 102, an operation instruction input by the person in charge of installation via the remote controller 10R, and outputs to the lens control unit 106, a control signal corresponding to the received operation instruction. The lens control unit 106 acquires control signals respectively indicating the lens zoom ratio, the lens focus, and the lens shift, and controls the lens shift mechanism 108 and the projection lens 107 so that the lens zoom ratio, the lens focus, and the lens shift correspond to these control signals (step S12).

Further, the person in charge of installation inputs a screen selection value via the remote controller 10R. For example, when the screen selection value is set to 16:9 at the time of shipment from the factory, and a screen 54 with a size of 16:10 is installed in a conference room 52, the screen selection value set to the projection device 10 and the size of the screen 54 do not match. Therefore, the person in charge of installation makes an operation input to set the screen selection value to 16:10 on the menu screen of the projection device 10. The CPU 105 changes the screen selection value from 16:9 to 16:10 according to the operation input by the person in charge of installation via the remote controller 10R (step S13).

Next, taking into account a distance between the projection device 10 and the screen 54 and a brightness of the lighting in the conference room 52, the person in charge of installation makes an operation input on the menu screen via the remote controller 10R to change the adjustment value of the amount of light of the light source 109, so that the brightness becomes enough to make a video signal easily visible. For example, the person in charge of installation makes an operation input on the menu screen to adjust the adjustment value of the amount of light of the light source 109 to 80%. The CPU 105 acquires the adjustment value of the amount of light (80% in this case) in response to the operation input by the person in charge of installation, and based on the acquired adjustment value of the amount of light, outputs to the light source 109, a control signal for setting the adjustment value of the light source to 80% (step S14). Accordingly, the light source 109 changes the amount of light to 80%.

Next, the person in charge of installation makes an operation input via the remote controller 10R to adjust the color temperature. Here, the person in charge of installation need not make any particular changes if, for example, the factory default color temperature of 7000K is used. When an operation input to change the color temperature is made by the person in charge of installation, the CPU 105 acquires the adjustment value of the color temperature according to the operation input, and performs a control so as to achieve the acquired adjustment value of the color temperature (step S15). Here, when no operation input to change the color temperature is made, the factory default setting of 7000K is left unchanged.

Next, the GPS 103 measures the latitude, longitude and altitude at which the projection device 10 is installed, and outputs to the CPU 105, a result of the measurement as position information. The CPU 105 acquires the position information output from the GPS 103 (step S16).

The processes from step S12 to step S16 need not necessarily be performed in this order, and may be performed in the order according to operation inputs regarding settings and adjustments by the person in charge of installation via the remote controller 10R. Further, for items that need not be set or adjusted, if there is no operation input regarding settings or adjustments via the remote controller 10R, the processes for which no operation inputs have been made need not be performed.

Next, the projection device 10 determines whether or not the condition for transmitting the device information to the device management server 20 is satisfied. For example, when a condition that the transmission time has come is used as the transmission condition, the CPU 105 determines, for example, whether or not a certain amount of time has passed since the last time an operation input regarding settings or adjustments was made via the remote controller 10R. When it is determined that the certain amount of time has passed, the CPU 105 determines that the transmission time for transmitting the device information to the device management server 20 has come (step S17—YES).

When it is determined that the transmission time for transmitting the device information to the device management server 20 has come, the CPU 105 transmits the device information to the device management server 20 via the communication line 60 and the network 40 (step S18). The device information transmitted here may include the lens zoom ratio, the lens focus, and the lens shift acquired in step S12, the screen selection value acquired in step S13, the adjustment value of the amount of light acquired in step S14, the adjustment value of the color temperature acquired in step S15, the position information acquired in step S16, and the serial number. Here, among step S12 to step S16, only the values that have been changed by operation inputs may be transmitted.

On the other hand, if the CPU 105 determines that the certain amount of time has not passed since the last time an operation input regarding settings or adjustments was made via the remote controller 10R, the CPU 105 determines that the transmission time for transmitting the device information to the device management server 20 has not yet come (step S17—NO).

When the transmission time has not yet come, the CPU 105 determines whether or not there has been an input to change the device information (step S19). Here, when there is an input to change at least one item of the device information, the CPU 105 determines that there is an input to change the device information (step S19—YES), and receives the operation input (step S20). When receiving this operation input, the CPU 105 changes the setting value or the adjustment value according to the operation input, and proceeds to step S17.

On the other hand, if there is no change to the device information in step S19, the CPU 105 determines that there is no input to change the device information (step S19—NO), and proceeds to step S17.

After step S18, the CPU 105 determines whether or not to end the processing. When determining to end the processing, the CPU 105 ends the processing, and when determining not to end the processing, the CPU 105 proceeds to step S17.

Figure 6:
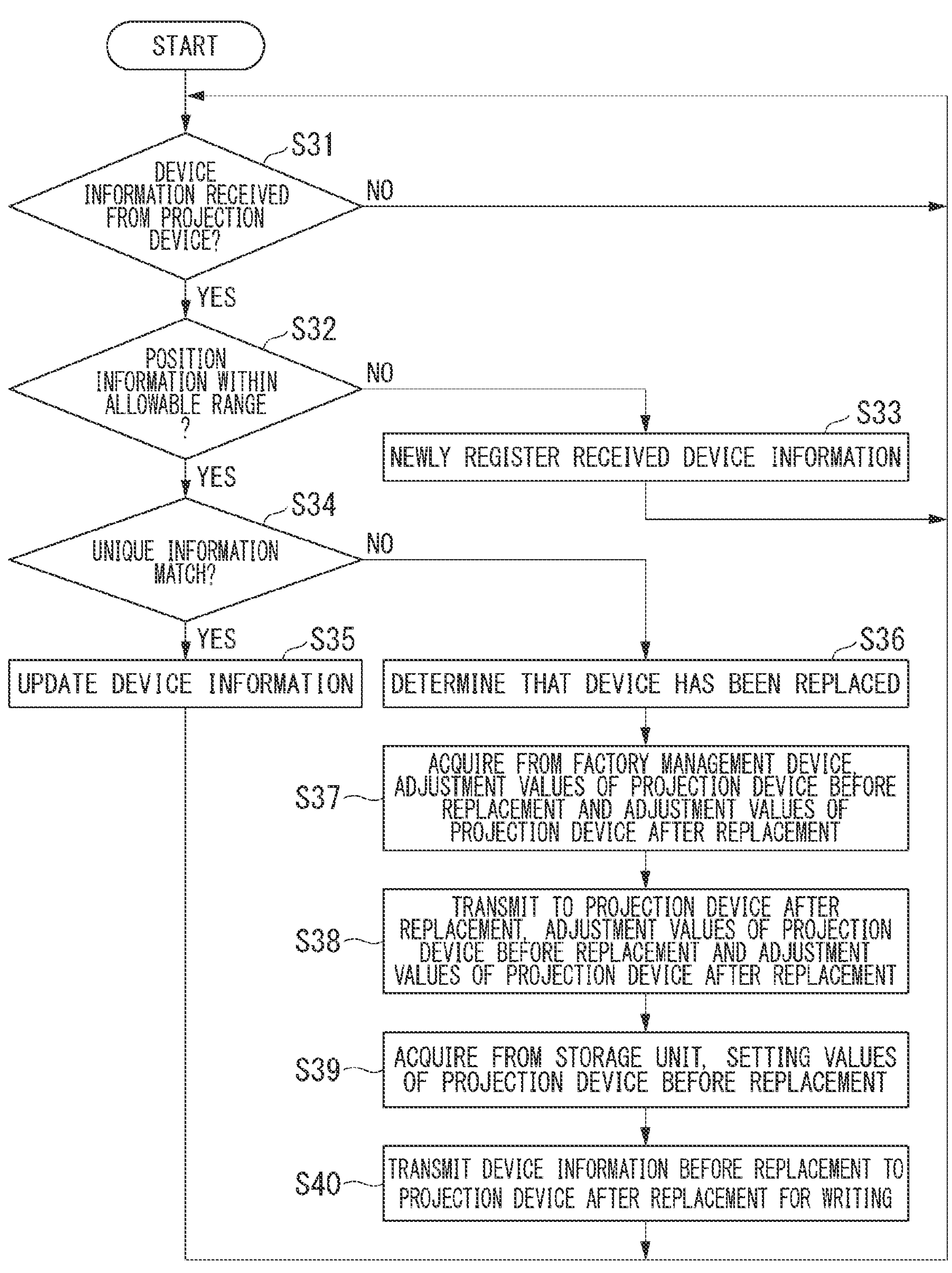
FIG. 6 is a flowchart illustrating processing of the device management server 20.

FIG. 6 is a flowchart illustrating processing of the device management server 20.

The CPU 202 of the device management server 20 determines whether device information has been received from the projection device 10 (step S31). When the CPU 202 determines that device information has not been received from the projection device 10 (step S31—NO), the CPU 202 performs the process of step S31 again after a certain amount of time passes.

On the other hand, when the CPU 202 determines that device information has been received from the projection device 10 (step S31—YES), the CPU 202 determines whether or not position information corresponding to the received position information is stored in the storage unit 203, based on the position information received from the projection device 10 by the communication unit 201 (step S32). Regarding whether or not position information corresponding to the received position information is stored in the storage unit 203, for example, the CPU 202 determines whether or not coordinate values based on the latitude, longitude, and altitude indicated by the received position information are within an allowable range of the coordinate values based on the latitude, longitude, and altitude indicated by the position information stored in the storage unit 203. Here, when a plurality of position information are stored in the storage unit 203, the CPU 202 compares the received position information with each of the plurality of position information stored in the storage unit 203. A baseline value for whether or not a value is within the allowable range can be arbitrarily determined, and may be determined based on, for example, a range in which the positions can be considered the same. As a specific example of the baseline value for whether or not a value is within the allowable range, for example, a baseline value can be defined such that a position determined by latitude and longitude is within a range of 1 m, and the altitude is within a range of 3 m. The altitude of 3 m can be determined, for example, according to the height of one floor of the building 50 (the height from the floor surface to the ceiling).

When the coordinate values based on the latitude, longitude, and altitude indicated by the received position information are not within the allowable range of the coordinate values based on the latitude, longitude, and altitude indicated by the position information stored in the storage unit 203 (step S32—NO), the CPU 202 newly registers the received device information by additionally storing it in the storage unit 203 (step S33). Here, when it is determined that the coordinate values are not within the allowable range, it can be recognized that the projection device 10 has been newly installed because the projection device 10 is one installed at a position different from the position information based on the already registered device information. For this reason, the CPU 202 newly registers the device information in the storage unit 203.

On the other hand, the CPU 202 determines in step S32 that the coordinate values based on the latitude, longitude, and altitude indicated by the received position information are within the allowable range of the coordinate values based on the latitude, longitude, and altitude indicated by the position information stored in the storage unit 203 (step S32—YES), the CPU 202 determines whether or not unique information corresponding to the position information determined to be within the allowable range, among the position information stored in the storage unit 203, matches the unique information received together with the position information (step S34).

When the unique information corresponding to the position information determined to be within the allowable range, among the position information stored in the storage unit 203, matches the unique information received together with the position information (step S34—YES), the CPU 202 updates, using the received device information, the device information determined to be within the allowable range, among the device information stored in the storage unit 203 (step S35). For example, the CPU 202 updates the device information by overwriting the device information determined to be within the allowable range, among the stored device information, with the received device information.

Here, the case where the position information is within the allowable range and the unique information matches is a case where the value of at least one item among the adjustment values and the setting values of the device information has been changed. In this case, the storage unit 203 stores the changed adjustment value and the changed setting value among the device information.

When the unique information corresponding to the position information determined to be within the allowable range, among the position information stored in the storage unit 203, does not match the unique information received together with the position information (step S34—NO), the CPU 202 determines that the projection device 10 has been replaced (step S36), and stores the received device information in the storage unit 203. Here, when the device has been replaced twice or more times at the same installation position, the immediately preceding device information may be left, and the more preceding device information may be deleted. Examples of cases where the projection device 10 is replaced include failure of the projection device 10, malfunction of the projection device 10, reaching the end of a life of the projection device 10, and the like.

The CPU 202 acquires from the factory management device 30, the adjustment values of the projection device 10 before a replacement and the adjustment values of the projection device 10 after the replacement (step S37). The adjustment values of the projection device 10 before the replacement are the device information whose position information is within the allowable range and which has already been stored in the storage unit 203. When a plurality of device information whose position information is within the allowable range are stored, it can be recognized that the device has been replaced twice or more times, the last stored device information among the plurality of device information may be acquired. Here, the CPU 202 transmits the unique information of the projection device 10 before the replacement and the unique information of the projection device 10 after the replacement to the factory management device 30 via the network 40 and the communication line 70 together with a request for transmitting adjustment values. In response to this transmission request, the factory management device 30 reads from the storage device, the adjustment values corresponding to the unique information of the projection device 10 before the replacement and the adjustment values corresponding to the unique information of the projection device 10 after the replacement, and transmits the read adjustment values to the device management server 20 via the communication line 70 and the network 40. As a result, the device management server 20 can acquire from the factory management device 30, the adjustment values corresponding to the projection device 10 before the replacement and the adjustment values corresponding to the projection device 10 after the replacement.

The CPU 202 transmits to the projection device 10 after the replacement, the adjustment values corresponding to the projection device 10 before the replacement and the adjustment values corresponding to the projection device 10 after the replacement (step S38).

The CPU 202 reads setting values of device information, among the device information stored in the storage unit 203, which includes position information corresponding to the position information received in step S31 and which includes unique information different from the received unique information (step S39). Then, the CPU 202 transmits the read setting values to the projection device 10 after the replacement via the communication unit 201 (step S40). Here, although the CPU 202 can transmit the setting values read in step S39 as they are to the projection device 10 after the replacement, the CPU 202 may transmit to the projection device 10 before the replacement, a setting value different from the setting values stored as the device information of the projection device 10 before the replacement. As a result, an amount of data to be transmitted can be reduced, so that the network load can be suppressed, and the load on the CPU 202 for data transmission can be reduced. Further, if a setting value different from the setting values stored as the device information of the projection device 10 before the replacement can be transmitted to the projection device 10 before the replacement, the setting values set to the projection device 10 before the replacement can be reflected to the projection device 10 after the replacement.

Figure 7:
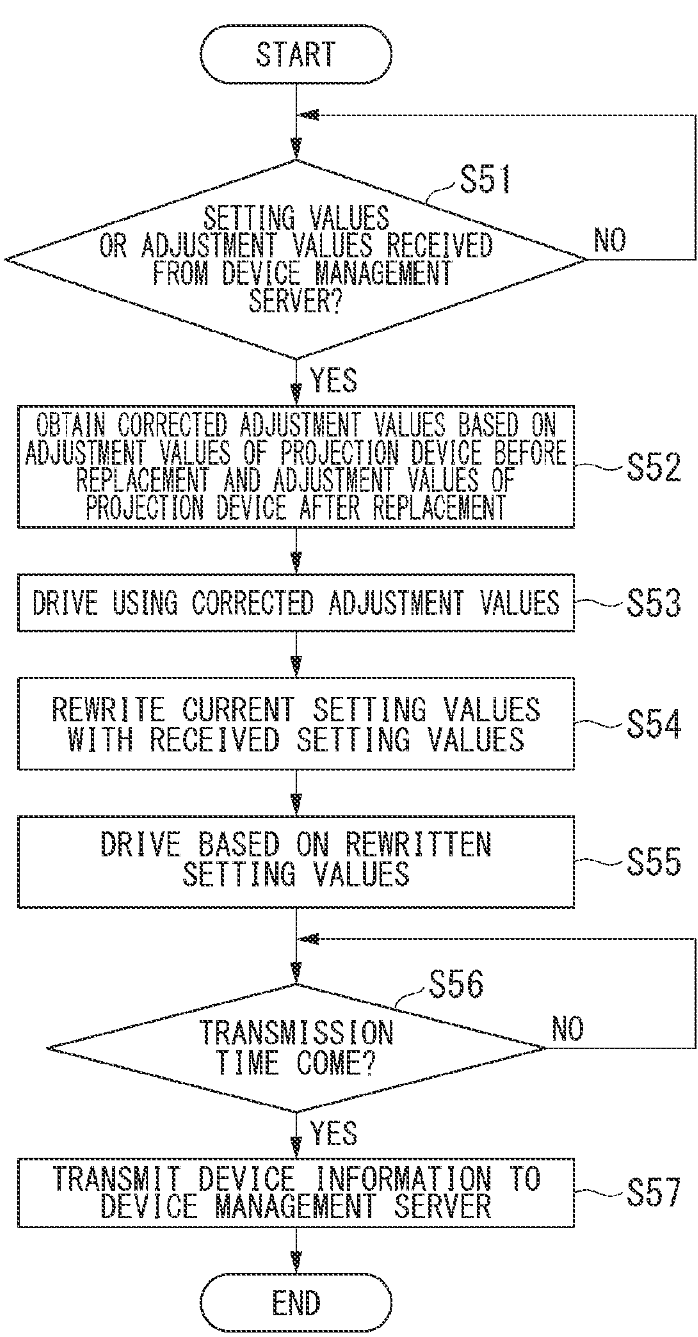
FIG. 7 is a flowchart illustrating an operation when the projection device 10 receives device information from the device management server 20.

FIG. 7 is a flowchart illustrating an operation when the projection device 10 receives device information from the device management server 20. A case will be described in which the processing of receiving the device information is performed separately from the processing of transmitting the device information in FIG. 5.

The CPU 105 of the projection device 10 determines whether setting values or adjustment values have been received from the device management server 20 (step S51). When neither setting values nor adjustment values have been received (step S51—NO), the CPU 105 proceeds to step S51 after a certain amount of time passes.

On the other hand, when the CPU 105 receives setting values or adjustment values (step S51—YES), if the received values are adjustment values, the received adjustment values include adjustment values of the projection device before the replacement and adjustment values of the projection device after the replacement. The CPU 105 obtains corrected adjustment values based on the adjustment values of the projection device before the replacement and the adjustment values of the projection device after the replacement (step S52). Then, the CPU 105 drives using the corrected adjustment values (step S53). As a result, it is possible to reduce individual differences between the projection device 10 before the replacement and the projection device 10 after the replacement.

Here, since there are individual differences between the projection device 10 before the replacement and the projection device 10 after the replacement, there is a case where the adjustment values of the projection device 10 before the replacement do not match the adjustment values of the projection device 10 after the replacement. The adjustment values of the projection device 10 before the replacement and the adjustment values of the projection device 10 after the replacement are stored in the factory management device 30 before respective shipments from the factory 31, and these adjustment values can be obtained by the device management server 20. Then, by obtaining the corrected adjustment values using these adjustment values, it is possible to reduce the differences between the adjustment values of the projection device 10 before the replacement and the adjustment values of the projection device 10 after the replacement, so that the effects caused by the individual differences can be reduced. Therefore, it is possible to provide the same brightness and color before and after the replacement. The corrected adjustment values are adjustment values corrected so as to reduce the individual differences between the projection device 10 before the replacement and the projection device 10 after the replacement.

Here, as a specific example, a case of correcting adjustment values of the color temperature and adjustment values of the brightness of the light source will be described.

For example, a case will be described as an example, in which measurement values (adjustment values) of adjustment items, measured by measuring instruments, in a factory shipment state of the projection device 10 before a replacement, and measurement values (adjustment values) of the adjustment items, measured by the measuring instruments, in a factory shipment state of the projection device 10 after the replacement, are assumed to be the following.

Regarding the projection device 10 before the replacement, when a setting value of a color temperature on the menu screen is assumed to be 7000K, a measurement value of the color temperature and a measurement value of the brightness of the light source 109, which are measured at the factory, are assumed to be:

Color temperature: 7200K

Brightness: 95%

In this case, in the inspection process, these measurement values are associated with the unique information of the projection device 10 before the replacement and stored in the factory management device 30 as device information.

Further, regarding the projection device 10 after the replacement, when a setting value of a color temperature on the menu screen is assumed to be 7000K, a measurement value of the color temperature and a measurement value of the brightness of the light source 109, which are measured at the factory, are assumed to be:

Color temperature: 6800K

Brightness: 100%

In this case, in the inspection process, these measurement values are associated with the unique information of the projection device 10 after the replacement and stored in the factory management device 30 as device information.

The CPU 202 can receive these measurement values from the factory management device 30 in step S37 of FIG. 6, and transmits them to the projection device 10 after the replacement in step S38 of FIG. 6.

In step S52 of FIG. 7, the CPU 105 obtains a corrected adjustment value so that the color temperature of the projection device 10 after the replacement becomes 7200K, which is the color temperature of the projection device 10 before the replacement.

For example, since the measured actual color temperature is 7200K when 7200K is set as the setting value of the color temperature to the projection device 10 before the replacement, if the projection device 10 after the replacement can project a video signal so that an actual color temperature becomes 7200K, the CPU 105 can display a video signal with a similar color temperature on the screen 54 even after the projection device 10 is replaced. For this reason, the CPU 105 obtains a color temperature of the projection device 10 after the replacement based on the following formula.

Corrected Adjustment Value(Color Temperature)=(Setting Value of Color Temperature×Adjustment Value of Color Temperature of Projection device 10 Before Replacement)/(Adjustment Value of Color Temperature of Projection device 10 After Replacement)

In this case, the CPU 105 can obtain a corrected adjustment value of the color temperature as 7412 by calculating (7000×7200)/6800. Therefore, the adjustment value of the color temperature of the projection device 10 after the replacement is set to 7412K. Then, using this adjustment value of the color temperature, the projection device 10 after the replacement displays a video signal. As a result, an actual color temperature becomes approximately 7200K, which is equivalent to the actual color temperature of 7200K of the projection device 10 before the replacement. This makes it possible to reduce the individual differences. Here, it is generally difficult for the naked eye to perceive a difference in color temperature of 100K or less. For this reason, the CPU 202 may set an adjustment value of the color temperature to 7400K on the menu screen of the projection device 10 after the replacement.

Further, instead of obtaining a corrected adjustment value based on the above-described formula, the CPU 105 may obtain a corrected adjustment value based on a formula for obtaining an offset value. The CPU 105 obtains an offset value by calculating (Measurement Value of Color Temperature of Projection device 10 Before Replacement)−(Measurement Value of Color Temperature of Projection device 10 After Replacement). Specifically, the CPU 105 obtains an offset value as (7200K-6800K)=400K. Then, the CPU 105 adds this adjustment value as the offset value to the color temperature set on the menu screen, and then displays a video signal. That is, the projection device 10 after the replacement adds the obtained offset value (400K) to the adjustment value of color temperature (6800K). As a result, when the color temperature is specified as 7000K on the menu screen, although a video signal is normally displayed at the actual color temperature of 6800K, the CPU 105 offsets the specified 7000K by 400K so that the video signal can be displayed at the actual color temperature of 7200K.

Regarding the brightness, based on the adjustment value of the projection device 10 before the replacement, the adjustment value of the projection device 10 after the replacement, and the adjustment value of the amount of light of the light source 109 which is specified on the menu screen, the CPU 105 uses as a corrected adjustment value of the amount of light, a value obtained by 95% (Factory Measurement Value of Brightness of Projection device 10 Before Replacement)×((100% (Factory Measurement Value of Brightness of Projection device 10 After Replacement)× 80% (Adjustment Value of Amount of light of Light Source on Menu Screen))=76%. As a result, by turning on the light source 109 so that the amount of light is based on the corrected adjustment value of the amount of light, the brightness can be adjusted so as to be substantially the same as that of the projection device 10 before the replacement.

When the CPU 105 receives setting values or adjustment values, and if the received values are setting values, the received setting values include at least a setting value of an item, among the target items, which has been changed from the time of shipment from the factory in the projection device 10 before the replacement. The CPU 105 rewrites the setting values stored in storage unit 110 with the received setting values (step S54). Examples of the items to be rewritten include a lens zoom ratio, a lens focus adjustment, a lens shift adjustment value, a screen selection value, and the like. For example, in a case where the screen selection value of the projection device 10 after the replacement (own projection device 10) is set to 16:10 at the time of shipment from the factory, and is changed to 16:9 after the projection device 10 before the replacement is actually installed, the CPU 105 writes 16:9 as the screen selection value of the projection device 10 after the replacement (own projection device 10).

The CPU 105 determines whether or not the condition for transmitting the device information is satisfied (step S56). When the condition for transmitting the device information is not satisfied (step S56—NO), the CPU 105 proceeds to step S56 after a certain amount of time passes.

When the condition for transmission is satisfied (step S56—YES), the CPU 105 transmits device information to the device management server 20. The device information transmitted here includes the unique information, the position information, and the setting values rewritten in step S54, which are of the projection device 10 as the transmission source of the device information.

Upon receiving the device information from the projection device 10, the device management server 20 determines whether the position information is within the allowable range and whether the unique information matches, similarly to the processing shown in FIG. 6. Here, since the position information is within the allowable range and the unique information matches, the device information is updated in step S35. As a result, the setting values set to the projection device 10 before the replacement can be inherited to the projection device 10 after the replacement, and those setting values can also be saved in the device management server 20.

Figure 8:
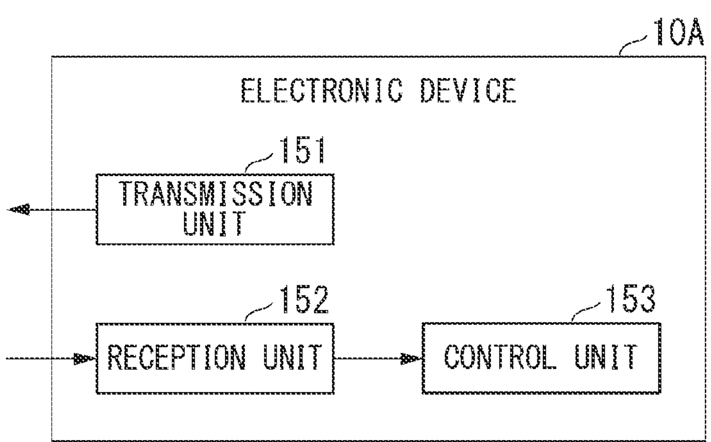
FIG. 8 is a functional block diagram showing a configuration of an electronic device 10A.

FIG. 8 is a functional block diagram showing a configuration of an electronic device 10A which is another embodiment of the electronic device described above.

The electronic device 10A includes a transmission unit 151, a reception unit 152, and a control unit 153.

The transmission unit 151 transmits to the device management server, position information indicating a position where the electronic device is installed, unique information uniquely assigned to the electronic device, and setting information set to the electronic device. The reception unit 152 receives from the device management server, setting information set to the electronic device, based on the position information and the unique information. The control unit 153 performs a setting of the electronic device based on the received setting information.

Such an electronic device 10A may be, for example, a projection device such as a projector, or may be a display device.

Used as the position information is information that identifies a place where the electronic device 10A is installed relative to a building, or a place where the electronic device 10A is installed relative to a fixture or the like arranged in the building.

As a result, when the electronic device 10A replaces another electronic device and is installed at the same place where the other electronic device was installed, if the position information is the same and the unique information is different before and after the replacement, the setting information of the electronic device before the replacement can be set to the electronic device 10A.

Further, instead of replacing another electronic device with the electronic device 10A, when replacing a component that constitutes the electronic device 10A and includes a memory storing the setting information, the setting information stored in the electronic device 10A will be lost due to the replacement of the component. Even in such a case, it is possible to acquire the setting information from the device management server based on the position information and the unique information of the electronic device 10A after the replacement of the component and set the acquired setting information to the electronic device 10A.

As the setting information, at least one of the above-described setting value and adjustment value can be used.

Figure 9:
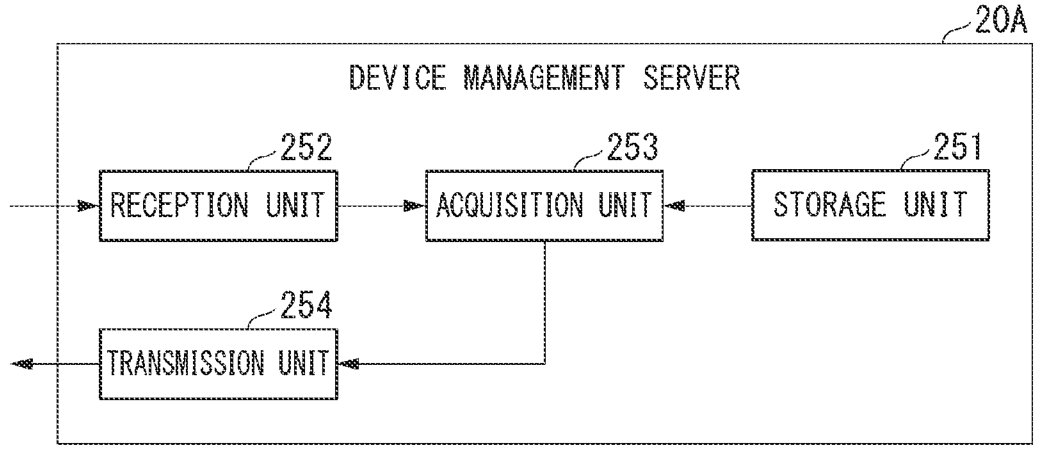
FIG. 9 is a functional block diagram showing a configuration of a device management server 20A.

FIG. 9 is a functional block diagram showing a configuration of a device management server 20A which is another embodiment of the device management server 20.

The device management server 20A includes a storage unit 251, a reception unit 252, an acquisition unit 253, and a transmission unit 254.

The storage 251 stores position information indicating a position where an electronic device is installed, unique information uniquely assigned to the electronic device, and setting information set to the electronic device. The reception unit 252 receives position information and unique information from the electronic device.

The acquisition unit 253 acquires from among the setting information stored in the storage unit 251, setting information corresponding to a combination of position information and unique information that matches a combination of the received position information and the received unique information.

The transmission unit 254 transmits the acquired setting information to the electronic device as a transmission source of the unique information.

In the above embodiment, it is determined whether or not the condition for transmitting device information to the device management server 20 is satisfied, and when the condition is satisfied, the device information is transmitted to the device management server 20. Here, if setting values and adjustment values are transmitted to the device management server 20 each time a change of the setting values and the adjustment values is made in the projection device 10, the load on the communication line 60 and the network 40 will be increased, so that responses of the projection device 10 and other computers connected to the communication line 60 and the network 40 will be lowered. Further, the load on the CPU 105 increases since the CPU 105 of the projection device 10 transmits the setting values and the adjustment values to the communication line 60 and the network 40 via the LAN control unit 101 each time. In this case, the speed of responding to remote control signals such as processing of receiving radio signals transmitted from the remote controller 10R may slow down, and display processing by OSD (On Screen Display) may slow down.

Further, if the CPU 105 constantly (for example, every second) acquires a zoom ratio, a brightness, a lens-related adjustment value, and a color-related adjustment value, the load on the CPU 105 increases, so that the speed of responding to remote control signals slows down, and the display processing by the OSD slows down.

In the above-described embodiment, the device information is transmitted to the device management server 20 when the condition is satisfied. For example, the setting values and the adjustment values are collectively transmitted to the device management server 20 a certain amount of time (four hours to the next day) after a change of the setting values and the adjustment values is made. Alternatively, all of the setting values and the adjustment values are notified to the CPU 105 from the remote controller 10R, notified to the CPU 105 from the menu, or notified to the CPU 105 when the power is turned off Thereby, it is possible to transmit to the device management server 20, setting values or adjustment values of items changed from the setting values or the adjustment values set at the factory, so that the traffic of the communication line 60 and the network 40 can be reduced, and the responsiveness of devices connected to the communication line 60, the network 40, and the communication line 70 can be enhanced. Further, since the load on the CPU 105 can also be reduced, it is possible to improve the speed of responding to remote control signals and the speed of displaying the menu by OSD. Since the response speed and the display speed can be improved, it is also possible to suppress a deterioration in operability.

Further, in the above-described embodiment, although the case has been described where it is determined whether or not the projection device 10 has been replaced based on whether or not the serial numbers match, the same can be done even in a case of using information unique to the device installed, instead of the serial numbers.

Further, when the installed projection device 10 breaks down and is repaired, there are two possible countermeasures.

When a repair is made without replacing a board mounted with the CPU 105, the setting values and the adjustment values are not changed.

When a repair involving a replacement of the board mounted with the CPU 105 is made, the CPU 105 compares the serial numbers assigned to the projection devices 10 before and after the replacement of the board, and also compares the serial numbers assigned to the boards before and after the replacement of the board. Then, when the serial numbers assigned to the projection devices 10 match and the serial numbers of the boards do not match, the CPU 105 determines that the board has been replaced, and can also set the setting values and the adjustment values to the board after the replacement.

That is, although the serial number is assigned to the projection device 10 (electronic device), there is a case where serial numbers for identifying components constituting the projection device 10 are also assigned to the components. In this case, the serial number assigned to the projection device 10 (device serial number) is different from the serial number assigned to the component (component serial number). The component serial number is stored in a memory provided in that component. When the component is a board mounted with the CPU 105, the component serial number is stored in a memory provided on the board. The device serial number may be stored in a memory of a component different from the board mounted with the CPU 105 of the projection device 10. For example, the device serial number may be stored in a memory provided in a component different from a component provided with a memory for storing setting information (setting values, adjustment values, etc.). As a result, even if the board provided with the CPU 105 is replaced, the device serial number remains the same before and after the replacement. For this reason, even if the board mounted with the CPU 105 is replaced by a repair, the setting information that has been set before the replacement can be reflected in the board after the replacement by acquiring the setting information from the device management server 20 based on the device serial number and the position information set to the electronic device.

Further, although the color temperature and the brightness have been described as the information necessary for performing a setting under the same conditions as of the previously installed model when replacing the projection device 10, there are color-related setting values such as a focus value, a zoom ratio, a lens shift value, and a contrast. When the performance of the projection device 10 before a replacement differs from that of the projection device 10 after the replacement, other items may be corrected in the same manner as the color temperature and the brightness. In this case, the factory management device 30 previously stores a conversion formula for replacing the projection device 10 with a different model, and based on model information of the projection device 10 before the replacement and model information of the projection device 10 after the replacement, the device management server 20 acquires the conversion formula for each item of these models from the factory management device 30 and transmits the acquired conversion formula to the projection device 10. The projection device 10 converts the setting values and the adjustment values based on these conversion formulas. As a result, even when replacing the projection device 10 with a different model, the difference between different models can be reduced.

Depending on the skill of an installer who installs the projection device 10, there may be differences in adjustment of focus and the like, and a video signal projected on the screen may be difficult to see. According to the above-described embodiment, the setting values and the adjustment values set to the projection device 10 before a replacement are used in the projection device 10 after the replacement. As a result, it is possible to adjust focus and the like, regardless of the skill of the installer, and also solve the problem that the video signal projected on the screen 54 is difficult to see. Further, it is also possible to eliminate omissions of settings and adjustments.

Further, when replacing the projection device 10 due to a failure, there is a case where the projection device before the replacement cannot be powered on. In this case, there has been a problem that various setting values and adjustment values are unknown. According to the above-described embodiment, even when the projection device 10 before the replacement cannot be powered on, the setting values and the adjustment values of the projection device 10 before the replacement can be received from the device management server 20, and the setting values and the adjustment values of the projection device 10 before the replacement can be acquired and set to the projection device 10 after the replacement.

In a case of multi-projection in which multiple projection devices are installed adjacent to each other and one video signal is displayed using the entire screens projected from these multiple projection devices, each unit has an individual difference (variation). For this reason, adjustments of brightness, color, gamma, and color unevenness, lens-related adjustments, and the like are highly difficult, and therefore a high level of skill is required to adjust these, and time-consuming adjustments must be performed for each unit. In such a case of multi-projection, there has been a problem that when one unit breaks down and needs to be replaced, the highly difficult and time-consuming adjustments must be performed again. Even in such a case, according to the above-described embodiment, the setting values and the adjustment values set to the projection device 10 before the replacement can be reflected to the projection device 10 after the replacement, and the individual differences can also be reduced. As a result, in the case of multi-projection, even when one unit breaks down and is replaced, the highly difficult and time-consuming adjustments need not be performed again.

Further, a program for realizing the functions of the projection device 10 or the functions of the device management server 20 in FIG. 1 may be recorded in a computer-readable recording medium, so that a computer system can read and execute the program recorded in the recording medium to realize the functions of the projection device 10 or the functions of the device management server 20. Here, the "computer system" referred to here includes an OS and hardware such as peripheral devices.

Further, the "computer system" includes home page providing environments (or display environments) when the WWW system is used.

Further, the "computer-readable recording medium" refers to portable media such as flexible disks, magneto-optical disks, ROMs and CD-ROMs, and storage devices such as hard disks built into computer systems. Further, the "computer-readable recording medium" includes one that retains a program for a certain period of time, such as a volatile memory inside a computer system that serves as a server or a client. Further, the above-described program may be one for realizing part of the above-described functions, or one capable of realizing the above-described functions in combination with a program already recorded in the computer system. Further, the above-described program may be stored in a predetermined server, so that it will be distributed (downloaded, or the like) via a communication line in response to a request from another device.

Although the embodiments of the present disclosure have been described in detail with reference to the drawings, the specific configurations are not limited to those embodiments, and include designs and the like within the scope of the gist of the present disclosure.

The invention claimed is:

1. An electronic device comprising:

a transmission unit configured to transmit to a device management server, position information indicating a position where the electronic device is installed, unique information uniquely assigned to the electronic device, and setting information set to the electronic device;

a first reception unit configured to receive from the device management server, setting information set to the electronic device, based on the position information and the unique information; and a control unit configured to perform a setting of the electronic device based on the received setting information, wherein the setting information set to the electronic device is associated with the unique information and the position information of the electronic device, and stored in the device management server, the electronic device further comprises a second reception unit configured to, when position information stored in the device management server corresponds to the position information transmitted by the transmission unit, and unique information associated with the corresponding position information does not match the unique information transmitted, receive from the device management server, setting information corresponding to the mismatched unique information, and the control unit is configured to perform the setting of the electronic device based on the received setting information.

2. The electronic device of claim 1, wherein the unique information includes a serial number.

3. The electronic device of claim 1, wherein the first reception unit is further configured to receive an adjustment value of device information which includes position information corresponding to the position information transmitted from the transmission unit and which includes unique information different from the unique information transmitted from the transmission unit, from the device management server configured to store the unique information assigned to the electronic device and an adjustment value of an adjustment target item of the electronic device which is adjusted so as to fall within a baseline value, and the control unit is configured to perform an adjustment for the adjustment target item of the electronic device based on the adjustment value of the received device information.

4. The electronic device of claim 1, further comprising a correction unit configured to correct an adjustment value stored in the electronic device, using the adjustment value received by the first reception unit, wherein the control unit is configured to perform at least one of a setting and an adjustment based on the corrected adjustment value.

5. The electronic device of claim 4, wherein the electronic device replacing another electronic device is installed at a position where the other electronic device has been installed, the device management server stores device information of the other electronic device, and the first reception unit of the electronic device is configured to, based on the position information and the unique information transmitted by the transmission unit, receive from the device management server, an adjustment value of the other electronic device as device information, among a plurality of device information stored in the device management server, which includes position information corresponding to position information of the electronic device and which includes unique information different from the unique information of the electronic device.

6. The electronic device of claim 1, further comprising:

an input unit configured to receive an operation input to change setting information;

a storage unit configured to store the setting information input from the input unit; and a determination unit configured to determine whether a condition for transmitting the setting information is satisfied, wherein the transmission unit is configured to transmit the position information, the unique information, and the setting information stored in the storage unit to the device management server when the condition for transmitting is satisfied.

7. A device management server comprising:

a storage unit configured to store position information indicating a position where an electronic device is installed, unique information uniquely assigned to the electronic device, and setting information set to the electronic device;

a first reception unit configured to receive position information and unique information from the electronic device;

a first acquisition unit configured to acquire from among a plurality of setting information stored in the storage unit, setting information corresponding to a combination of position information and unique information that matches a combination of the received position information and the received unique information; wherein when the electronic device replacing another electronic device is installed at a place where the other electronic device has been installed, and device information of the other electronic device is stored in the storage unit, the first reception unit is configured to receive position information and unique information from the electronic device, and the first acquisition unit is configured to, based on the position information and the unique information received from the electronic device, acquire from among a plurality of setting information stored in the storage unit, setting information in which position information corresponding to the position information of the electronic device is associated with unique information different from the received unique information.

8. The device management server of claim 7, wherein the first reception unit is configured to receive the position information, the unique information, and a setting value set to the electronic device as the transmission source, and the device management server further comprises:

a writing unit configured to, when position information and unique information which match the combination of the position information and the unique information received by the first reception unit are stored in the storage unit, associate the received setting value with the stored position information and the stored unique information, and store the associated setting value in the storage unit;

a second acquisition unit configured to, when the position information in the combination of the position information and the unique information received by the first reception unit matches the position information stored in the storage unit, and the unique information in the received combination does not match the unique information stored in the storage unit, acquire a setting value corresponding to the mismatched unique information from the storage unit; and a second transmission unit configured to transmit the acquired setting value to the electronic device as the transmission source of the unique information.

9. The device management server of claim 7, further comprising a correction unit configured to, when the position information in the combination of the position information and the unique information received by the first reception unit matches the position information stored in the storage unit, and the unique information in the received combination does not match the unique information stored in the storage unit, correct the received setting information using the setting information corresponding to the unique information determined not to match, wherein the first transmission unit is configured to transmit the corrected setting information to the electronic device as the transmission source of the unique information.

10. A control method for an electronic device, comprising:

transmitting to a device management server, position information indicating a position where the electronic device is installed, unique information uniquely assigned to the electronic device, and setting information set to the electronic device;

receiving from the device management server, setting information set to the electronic device, based on the position information and the unique information;

performing a setting of the electronic device based on the received setting information;

receiving an adjustment value of device information which includes position information corresponding to the position information transmitted from the transmission unit and which includes unique information different from the unique information transmitted from the transmission unit, from the device management server configured to store the unique information assigned to the electronic device and an adjustment value of an adjustment target item of the electronic device which is adjusted so as to fall within a baseline value; and performing an adjustment for the adjustment target item of the electronic device based on the adjustment value of the received device information.

11. The control method of claim 10, wherein the setting information set to the electronic device is associated with the unique information and the position information of the electronic device, and stored in the device management server, and the electronic device further comprises:

when position information stored in the device management server corresponds to the position information transmitted by the transmission unit, and unique information associated with the corresponding position information does not match the unique information transmitted, receiving from the device management server, setting information corresponding to the mismatched unique information; and performing the setting of the electronic device based on the received setting information.

12. The control method of claim 10, further comprising:

correcting an adjustment value stored in the electronic device, using the adjustment value received by the first reception unit; and performing at least one of a setting and an adjustment based on the corrected adjustment value.

13. The control method of claim 10, further comprising:

when the electronic device replacing another electronic device is installed at a position where the other electronic device has been installed, and the device management server stores device information of the other electronic device, based on the position information and the unique information transmitted, receiving from the device management server, an adjustment value of the other electronic device as device information, among a plurality of device information stored in the device management server, which includes position information corresponding to position information of the electronic device and which includes unique information different from the unique information of the electronic device.

14. A control method for a device management server, the method comprising:

storing in a storage unit of the device management server, position information indicating a position where an electronic device is installed, unique information uniquely assigned to the electronic device, and setting information set to the electronic device;

receiving position information and unique information from the electronic device;

acquiring setting information corresponding to a combination of position information and unique information that matches a combination of the received position information and the received unique information;

transmitting the acquired setting information to the electronic device as a transmission source of the unique information; and when the position information in the received combination of the position information and the unique information matches the position information stored in the storage unit, and the unique information in the received combination does not match the unique information stored in the storage unit, correcting the received setting information using the setting information corresponding to the unique information determined not to match; and transmitting the corrected setting information to the electronic device as the transmission source of the unique information.

15. The control method of claim 14, further comprising:

receiving the position information, the unique information, and a setting value set to the electronic device as the transmission source, and when position information and unique information which match the combination of the received position information and the received unique information are stored in the storage unit, associating the received setting value with the stored position information and the stored unique information, and storing the associated setting value in the storage unit;

when the position information in the received combination of the position information and the unique information matches the position information stored in the storage unit, and the unique information in the received combination does not match the unique information stored in the storage unit, acquire a setting value corresponding to the mismatched unique information from the storage unit; and transmitting the acquired setting value to the electronic device as the transmission source of the unique information.

16. The control method of claim 14, further comprising:

when the electronic device replacing another electronic device is installed at a place where the other electronic device has been installed, and device information of the other electronic device is stored in the storage unit, receiving position information and unique information from the electronic device, and based on the position information and the unique information received from the electronic device, acquiring from among a plurality of setting information stored in the storage unit, setting information in which position information corresponding to the position information of the electronic device is associated with unique information different from the received unique information.

* * * * *